United States Patent [19]
Konya et al.

[11] 3,915,685

[45] Oct. 28, 1975

[54] NON-MEDICAL FUNGICIDAL BACTERIACIDAL AND ALGICIDAL COMPOSITION

[75] Inventors: Kazumi Konya, Shimizu; Konagai, Yoshihiro, Shizuoka; Mikoto Muto; Hironari Sato, both of Shimizu; Yoshio Takahashi, Shizuoka, all of Japan

[73] Assignee: Kumiai Chemical Industry Co., Ltd., Tokyo, Japan

[22] Filed: Mar. 28, 1974

[21] Appl. No.: 455,910

[30] Foreign Application Priority Data

Mar. 30, 1973 Japan.............................. 48-36270

[52] U.S. Cl. .................... 71/67; 424/304; 424/311
[51] Int. Cl.$^2$............................................ A01N 9/02
[58] Field of Search ................. 424/304, 311; 71/67

[56] References Cited

UNITED STATES PATENTS

| | | | |
|---|---|---|---|
| 2,840,598 | 6/1958 | Schwartz | 71/106 |
| 2,873,249 | 2/1959 | Schwartz | 424/331 |
| 3,647,610 | 3/1972 | Wolf | 424/304 |
| 3,824,316 | 7/1974 | Shema | 71/67 |

OTHER PUBLICATIONS

Winther, "Biological Demonstration of Preservatives, etc.," (1960) CA 58, p. 4969 (1963).

*Primary Examiner*—Glennon H. Hollrah
*Attorney, Agent, or Firm*—Oblon, Fisher, Spivak, McClelland & Maier

[57] ABSTRACT

A composition of a compound having the formula:

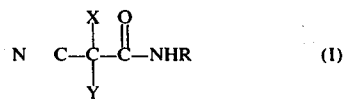

wherein X represents a halogen atom; Y represents a halogen atom or hydrogen atom; and R represents hydrogen atom or a lower alkyl group; and a compound having the formula:

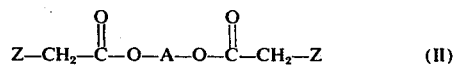

wherein Z represents a halogen atom; and A represents an alkylene or alkenylene group, have been found to possess excellent fungicidal, bacteriacidal and algicidal properties.

5 Claims, No Drawings

NON-MEDICAL FUNGICIDAL BACTERIACIDAL AND ALGICIDAL COMPOSITION

BACKGROUND OF THE INVENTION

1. Field of the Invention

This invention relates to a non-medical fungicidal, bacteriacidal, and algicidal composition which comprises, as active ingredients, a compound having the formula

$$N \equiv C - \overset{X}{\underset{Y}{C}} - \overset{O}{\underset{}{C}} - NHR \quad (I)$$

wherein X represents a halogen atom; Y represents a halogen atom or hydrogen atom; and R represents hydrogen atom or a lower alkyl group; and a compound having the formula

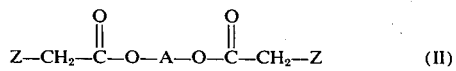

$$Z - CH_2 - \overset{O}{\underset{}{C}} - O - A - O - \overset{O}{\underset{}{C}} - CH_2 - Z \quad (II)$$

wherein Z represents a halogen atom; and Z represents an alkylene or alkenylene group.

2. Description of the Prior Art

Non-medical fungicidal and algicidal compositions are useful for inhibiting the growth of fungi, bacteria, yeasts, algae, etc., in industrial waters, such as the effluent from paper mills, or industrial cooling waters, or in cooling waters for air-conditioners, metal processing lubricant oils, latex emulsions, aqueous emulsions, paper woods, plywoods, paints, pastes, pulps, fibers, etc.. The unlimited proliferation of microorganism can cause a decrease in product quality or can cause product damage. It can also be the cause for long operation shutdowns or can otherwise cause severe economic loss.

The control of the proliferation of microorganism in industrial waters is especially important in those systems that use large water recirculation systems, since such systems can become virtual breeding grounds for the growth of a wide variety of organisms. As the waters become increasingly contaminated, disposal becomes an increasing problem because discharge into the waterways could cause pollution of the rivers or seas.

Moreover, the unrestricted growth of microorganisms can cause clogging of the pipes or can frustrate heat-exchange due to the build-up of fungi, or bacteria, generally called slime and algae.

Slime formed in an important part of an apparatus, such as in a white water tank, a riffler wall or a screen in a paper and pulp industry can tend to stain the product thereby decreasing quality of the product. Slime present in paper manufacturing can also cause paper tearing in the high speed processing machines. Another example of such difficulties is in lubricant emulsion, recycling systems commonly used in metal processing. In these systems, the proliferation of fungi or bacteria, can cause rotting of the emulsion.

In other industries as well, organisms, such as in the production of paints, latex emulsions, fiber pastes, plywoods. etc. the proliferation of fungi or bacteria can be quite deleterous.

SUMMARY OF THE INVENTION

Accordingly, it is one object of this invention to provide a non-medical fungicidal, bacteriacidal, and algicidal composition for the prevention of difficulties caused by these organisms.

This object and other objects of this invention, as will hereinafter become more readily apparent, have been attained by providing a composition which comprises as active ingredients a halocyanoacetamide having the formula:

$$N \equiv C - \overset{X}{\underset{Y}{C}} - \overset{O}{\underset{}{C}} - NHR \quad (I)$$

wherein X represents a halogen atom; Y represents a halogen atom or hydrogen atom; and R represents hydrogen atom or a lower alkyl group; and a compound having the formula:

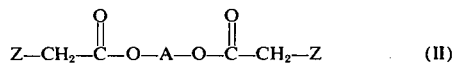

$$Z - CH_2 - \overset{O}{\underset{}{C}} - O - A - O - \overset{O}{\underset{}{C}} - CH_2 - Z \quad (II)$$

wherein Z represents a halogen atom; and A represents an alkylene or alkenylene group.

Particularly noteable halogens X, Y and Z are bromine, chlorine, and iodine. Particularly noteable lower alkyl group R are the $C_1$–$C_{10}$ groups. Particularly noteable alkylene groups A are the $C_2$–$C_{10}$ groups and particularly suitable alkenylene groups are the $C_3$–$C_{10}$ groups.

DETAILED DESCRIPTION OF THE INVENTION

It has now been found that the combination of compounds (I) and (II) above is quite effective as a non-medicinal microbicidal or algicidal composition. Heretofore, certain organo metal compounds, such as the organo-mercury compounds, e.g., bis(ethylmercury) hydrogen phosphate, and phenyl-mercury acetate; organo-tin compounds, e.g., tri-butyl tin oxide, have been widely used as a microbicides. However, as an unwanted side effect, these compounds show high toxicity to fish and shell fish in the rivers wherein the drainage flows and thus have been the cause of ecological problems. The use of those compounds therefore is now properly regulated.

As a substitute for such compounds, organo-chlorine compounds, organic sulfur compounds or quaternary ammonium have been proposed. However, the organo-chlorine compounds are characterized by unpleasant odors or can cause severe irritation. The organic sulfur compounds are coloring agents and the quaternary ammonium compounds tend to form scums. The microbicidal, bacteriacidal and algicidal compositions of the present invention, on the contrary, do not cause similar problems, and in combination they exhibit superior microbicidal and algicidal effects as compared with the conventional organo-mercury compounds.

The acetamide compounds of the formula (I) are inactive to certain bacteria, fungi, algae, and are unsuited as a microbicide or as an algicide, and have very poor practical value, if used alone. Furthermore, should the basicity of the water system to which the acetamide compound is applied, be alkaline, the effect of the compound will rapidly decrease because of the inherent instability of the compound in alkaline media. It would thus hardly be expected that the acetamide compounds, would be effective in the present invention. While it is known that the acetamide compounds have been used in combination with alkali metal halides, however, as shown in the specification of Japanese Patent Application Publication No. 28140/1972, the effect of the acetamide compounds has not been improved for the practical application in that combination.

Compounds of the formula (II) are moderately active against bacteria, fungi, algae, etc. and are more active than the compounds having the formula (I). However, their microbicidal and algicidal effects are especially insufficient in lower concentrations and in practical applications necessitating higher concentrations, they are quite ineffective as slime control agents because of their high costs and because it is suspected that they can cause undesirable side effects.

As can clearly be seen from the above discussion, both compounds (I) and (II) have known disadvantages which make their successful use as an industrial microbicide and algicide improbable at best, if used separately. It is therefore quite surprising that the present inventors have now found that the combination of compounds (I) and (II) provide excellent microbicidal and algicidal effects when combined in a ratio of 1:0.1 – 10 preferably 1:0.2–4, (compound I: compound II) even in low concentrations.

The composition of this invention can be used in the form of an emulsifible concentrate, wettable powder or other suitable form, with or without additional adjuvant, depending on the actual application conveniences. It can be used in the recycling water in paper and pulp mills or in cooling towers as a slimicide when added proportionwise at intervals or continuously or gradually in dosages determined to fit the actual process, and the extent of microbe or algae growth density. Usually this means, with addition at intervals, addition of 1 – 3 times a day, 15–60 minutes, each application a final concentration of combined chemicals as high as 5 – 100 ppm in the treated water-way. When continuous addition is used, suitable dosage ranges are from 0.1-50 ppm of combined chemicals in running water. When adding the same combination in lubricant emulsion or cutting oil emulsion to be recycled in metal processing factory, the dosages will depend upon the varieties of organism present, and the extent of contamination.

The pH of the medium being treated does not seem to have an effect on the microbial or aligicidal effects of the composition. The microbicidal and algicidal composition of the present invention are effective against a wide variety of fungi, such as aspergillus niger, penicillium steckii, trichoderma, geotrichum, candidum, bacteria, such as aerobacter aerogenes, bacillus stubtilis, etc., even in low concentrations (in such concentrations, each of the compounds would not impart fungicidal effects if used above), so that the growth of noxious microorganism in industrial waters can be completely inhibited with relatively small amounts of the composition. The composition of the present invention is therefore, ideal for use as a slime control agent for inhibiting the proliferation of microorganism, such as fungi, bacteria, yeast algae, etc., in recycled water systems, such as used in paper and pulp mills and cooling towers, etc., when the compounds (I) and (II) are combined in the above-mentioned ratios, the fungi, bacteria, yeast and algae which cause the slime can be inhibited in a low concentration.

Suitable halocyanoacetamides of the formula (I), can be monobromocyanoacetamide, dichlorocyanoacetamide, dibromocyanoacetamide, N-methyldibromocyanoacetamide, or the like. Suitable haloacetic esters of the formula (II) can be 1,2-bis(bromoacetoxy) ethane, 1,2-bis(bromoacetoxy)propane, 1,2-bis(chloroacetoxy) ethane, 1,4-bis(bromoacetoxy)-2-butene, which are disclosed in U.S. Pat. No. 2,873,249. The combination of dibromocyanoacetamide and 1,4-bis(bromoacetoxy)-2-butene provide the highest microbicidal and algicidal effects.

Having generally described the invention, a more complete understanding can be obtained by reference to certain specific examples, which are included for purposes of illustration only and are not intended to be limiting unless otherwise specified.

In these examples term of part designates part by weight.

EXAMPLE 1

10 parts of monobromocyanoacetamide, 30 parts of 1,2-bis(bromoacetoxy) ethane and 58 parts of ethyleneglycol, 1.7 parts of polyoxyethylenenonylphenol ether and 0.3 part of calcium dodecylbenzenesulfonate were mixed to form an emulsifible concentrate.

EXAMPLE 2

10 parts of dichlorocyanoacetamide, 30 parts of 1,2-bis(chloroacetoxy) ethane, 58 parts of polyethyleneglycol, 1.7 parts of polyoxyethylenenonylphenyl ether and 0.3 parts of calcium dodecylbenzenesulfonate were mixed to form an emulsifible concentrate.

EXAMPLE 3

10 parts of dibromocyanoacetamide, 30 parts of 1,4-bis(bromoacetoxy)-2-butene, 58 parts of polyethyleneglycol (M.W. 200), 1.7 parts of polyoxyethylenenonylphenyl ether and 0.3 part of calcium dodecylbenzenesulfonate were mixed to form an emulsifible concentrate.

EXAMPLE 4

15 parts of dibromocyanoacetamide, 15 parts of 1,4-bis(bromoacetoxy)-2-butene, 68 parts of ethyleneglycol and 1.7 parts of polyoxyethylenenonylphenyl ether (M.W. 200) and 0.3 part of calcium dodecylbenzenesulfonate were mixed to form an emulsifible concentrate.

EXAMPLE 5

10 parts of dibromocyanoacetamide, 30 parts of 1,4-bis(bromoacetoxy)-2-butene, 2 parts of sodium dodecylbenzene sulfonate and 2 parts of sodium lignin sulfonate and 56 parts of diatomaceous earth were mixed and crushed to form a wettable powder. The effect of the compositions of the invention is illustrated by certain experiments.

Experiment 1

*Aerobacter aerogenes* IAM 1102 which typically grows in a water system, was cultured in a broth liquid medium by shaking for 24 hours, and diluted 1,000 times. 1 ml of the diluted solution containing *Aerobacter aerogenes* was added to 18 ml of a fresh broth liquid medium in a conical flask closed with a sterilized cotton. 1 ml of a solution with active ingredient concentration defined in Table 1, was added to the flask and then the flask was shaken in a bath kept at 28°C. After 5, 15, 30, 90 and 180 minutes from the addition of the active ingredient, the number of *Aerobacter aerogenes* in each broth liquid medium was measured to determine the fungicidal effects of the active ingredient. The results are shown in Table 1.

1. Example 2   Compound(I) 10%   Compound(II) 30%
2. Example 3   Compound(I) 10%   Compound(II) 30%
3. Example 4   Compound(I) 15%   Compound(II) 15%
4. 1,4-bis(bromoacetoxy)-2-butene   60% emulsifible concentrate
5. dibromocyanoacetamide   40% emulsifible concentrate
6. dichlorocyanoacetamide   40% emulsifible concentrate
7. 1,2-bis(chloroacetoxy)ethane   60% emulsifible concentrate Table 2

| Active ingredient | Growth inhibition minimum concentration (active ingredient ppm) | | | | | | |
|---|---|---|---|---|---|---|---|
| | 1 | 2 | 3 | 4 | 5 | 6 | 7 |
| *Aerobacter aerogenes* | 25 | 12.5 | 6 | 75 | 100 | 100 | 100 |
| *Bacillum subtilis* | 12.5 | 6 | 6 | 50 | 100 | 100 | 100 |
| *Echerichia Coli* | 25 | 6 | 6 | 50 | 25 | 25 | 100 |
| *Pseudomonas aehginosa* | 50 | 6 | 6 | 50 | 25 | 50 | 100 |
| *Aspergillus niger* | 50 | 12.5 | 12.5 | 100 | 200 | 250 | 150 |
| *Penicillium steckii* | 50 | 6 | 6 | 100 | 250 | 200 | 150 |
| *Trichoderma SP* | 100 | 12.5 | 5 | 150 | 200 | 200 | 250 |
| *Geotrichum candidum* | 100 | 6 | 6 | 75 | 150 | 150 | 150 |

As is clear from Table 2, the compounds (I) or (II) are each much less effective when used alone for the inhibition of bacteria, as compared to their combined Table 1

| Active ingredient | Conc. of active ingredient (ppm) | Time for contacting active ingredient (number of bacteria N/ml) | | | |
|---|---|---|---|---|---|
| | | 10 min. | 30 min. | 90 min. | 180 min. |
| Example 1 composition | 3 + 9 | 62,000 | 18,000 | 460 | 10 |
| Example 3 composition | 3 + 9 | 4,000 | 100 | 10 | 0 |
| Example 4 composition | 6 + 6 | 4,700 | 880 | 80 | 0 |
| dibromocyanoacetamide 30% emul. | 15 | 28,000 | 74,000 | 82,000 | 100,000 |
| dibromocyanoacetamide 30% sodium iodide 20% | 15 + 10 | 28,000 | 68,000 | 50,000 | 68,000 |
| bromocyanoacetamide 20% emul. | 15 | 63,000 | 220,000 | 120,000 | 900,000 |
| 1,4-bis(bromoacetoxy)-2-butene 60% emul. | 20 | 100,000 | 98,000 | 90,000 | 310,000 |
| 1,2-bis(bromoacetoxy)ethane 60% emul. | 20 | 100,000 | 210,000 | 68,000 | 120,000 |
| No ingredient | — | 520,000 | 680,000 | 1,100,000 | 4,300,000 |

The compound (I) or (II) when used alone was not effective to inhibit the growth of *Aerobacter aerogenes* in concentrations of 15-20 ppm, however, the combination of the two compounds imparted unexpectedly high fungicidal effects at the same concentrations.

Experiment 2

The test results of the growth inhibition concentration of the compositions in the present invention measured by agar dilution method in a broth liquid medium (pH 7.5 in case of bacteria and pH 4.5 in case of fungi) are shown in Table 2. The active ingredients used in the tests are as follows.

effects. While the combinations themselves are quite effective against microorganism which cause difficulties for industrial water systems and in industrial products, such as *Aerobacter aerogenes*, *Bacillum subtilis*, *Echerichia coli*, *Pseudomonas aehginosa*, *Aspergillus niger*, *Penicillium steckii*, *Trichoderma SP*, *Geotrichum candidum*.

Experiment 3

Fungicidal activities in white water under weak alkaline condition

Into a 100 ml conical flask, was introduced 18 ml white water containing 0.05 – 0.1% of pulp fibrils, the pH adjusted to 8.1 and 2 ml of a diluted solution of the combination of the present invention and each of their ingredients at specific concentrations were added. The mixture was continuously shaken at 30°C. After 30, 90 and 120 minutes from the addition of the diluted solution, 1 ml of white water was extracted from each of flask and was uniformly mixed with 16 ml of MW medium and poured into Petri dish having a diameter of 9 cm to solidify. Each of the microorganisms was cultured at 28°C for 48 hours and the number in the colony in each petri dish was counted to determine the fungicidal effect of the active ingredients. The results are shown in Table 3.

Table 3

| Active ingredient | Conc. of active ingredient (ppm) | Coloni number in 1 ml. of white water | | |
|---|---|---|---|---|
| | | 30 min. | 90 min. | 120 min. |
| Example 2 | 12.5 | 33,000 | 9,800 | 230 |
| Example 3 | 12.5 | 1,800 | 270 | 61 |
| Example 4 1,4-bis(bromoacetoxy)-2-butene 60% emulsion | 12.5 | 2,800 | 380 | 10 |
| dibromocyanoacetamide | 12.5 | 1,000,000 | 840,000 | 420,000 |
| 30% emulsion dibromocyanoacetamide 30% sodium iodide | 12.5 | 650,000 | 130,000 | 6,600,000 |
| 20% emulsion | 12.5 | 460,000 | 110,000 | 3,600,000 |
| non-ingredient | — | 43,000,000 | 29,000,000 | 83,000,000 |

Experiment 4

Cosmarium and Oscillatoria (algae) adhered on a cooling tube were collected and cultured. The composition of Example 4 (30% e.c.), 60% e.c. of 1,4-bis(-bromoacetoxy)-2-butene, and 3% e.c. of dibromocyanoacetamide were respectively diluted to contain 5, 10, 50, 100, 150 and 200 ppm. thereof.

The cultured Cosmarium or Oscillatoria was dipped into the diluted solution of the active ingredient for 1 hour, and then removed and also dipped in a distilled water for 24 hours. The growth of Cosmarium or Oscillatoria was judged by separating the protoplasm thereof, and the minimum effective concentration (ppm) of the active ingredient for the algicide was tested. The results are shown in Table 4.

Table 4

| | Example 4 (1 : 1) | 1,4-bis(bromoacetoxy) 2-butene | dibromocyanoacetamide |
|---|---|---|---|
| Cosmarium | 5 | 50 | 200 |
| Oscillatoria | 5 | 100 | 200 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A microbicidal composition which comprises an inert carrier and an effective amount of the admixture of a halocyanoacetamide selected from the group consisting of monobromocyanoacetamide, dichlorocyanoacetamide, dibromocyanoacetamide and N-methyldibromocyanoacetamide and a haloacetic ester selected from the group consisting of 1,2-bis(bromoacetoxy) ethane, 1,2-bis(bromo-acetoxy) propane, 1,2-bis-(chloroacetoxy) ethane and 1,4-bis(-bromoacetoxy)-2-butene, the ratio of the amide to the ester being from 1:1 to 1:4.

2. A method of treating water to inhibit the growth of microorganisms, which comprises adding an effective amount of the composition of claim 1 to said water.

3. A method of inhibiting the growth of microorganisms which comprises contacting said microorganisms with an effective amount of the composition of claim 1.

4. A method for inhibiting the growth of slime in water which comprises adding an effective amount of the composition of claim 1 into said water.

5. The composition of claim 1 which is monobromocyanoacetamide and 1,2-bis-(bromoacetoxy) ethane.

* * * * *